Figure 1:
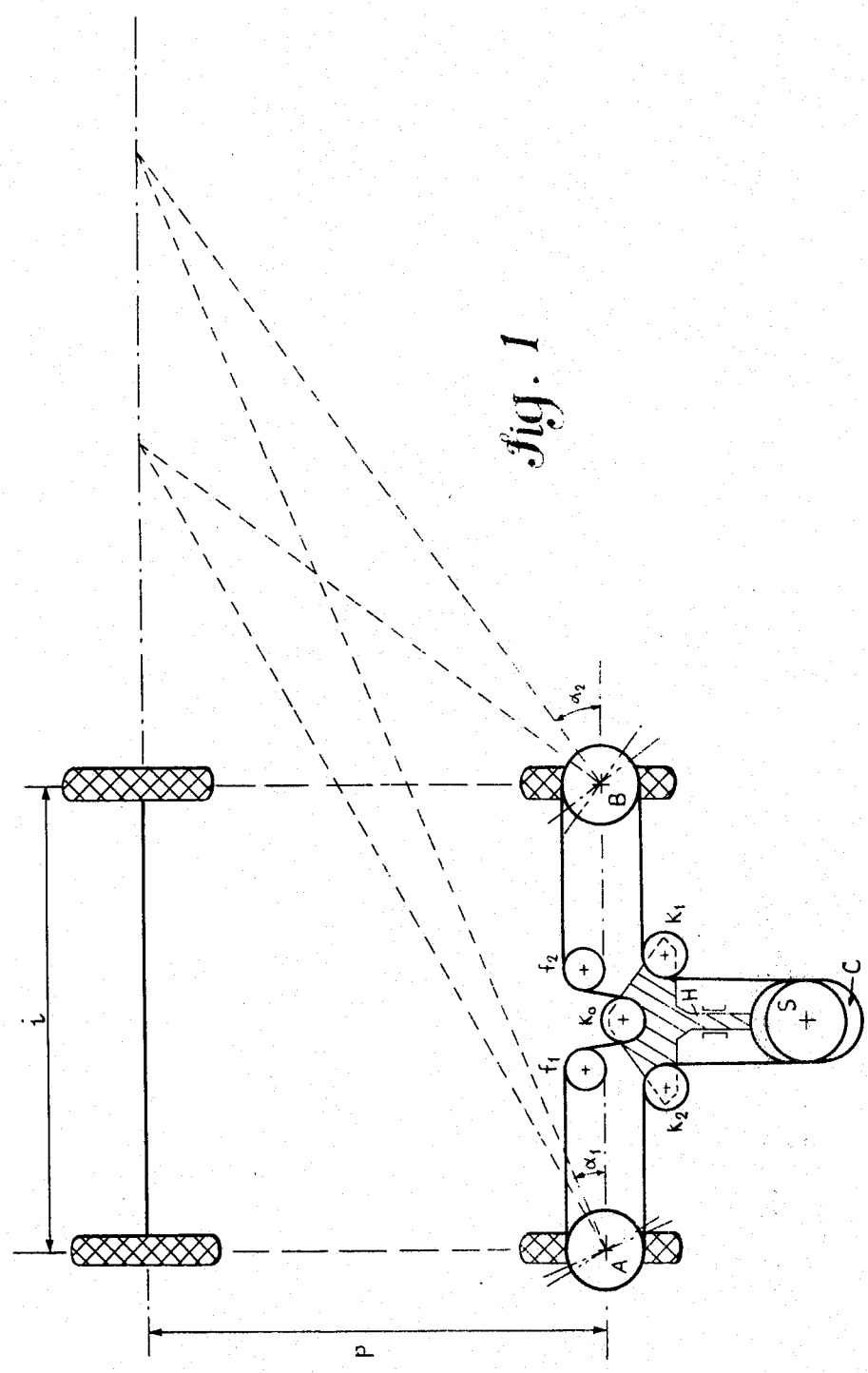

United States Patent
Di Chirico

[11] 3,917,305
[45] Nov. 4, 1975

[54] CONTROL MECHANISM FOR COMPENSATING STEERING ANGLES IN VEHICLE DIRECTIONAL WHEELS

[76] Inventor: Giuseppe Di Chirico, No. 28, Via della Balduina, Rome, Italy

[22] Filed: Apr. 18, 1974

[21] Appl. No.: 462,157

[30] Foreign Application Priority Data
July 26, 1973 Italy .................................. 51671/73

[52] U.S. Cl. .............................................. 280/93
[51] Int. Cl.² ........................................ B62D 3/02
[58] Field of Search ......... 280/87 R, 91, 93; 74/496

[56] References Cited
UNITED STATES PATENTS

| | | | |
|---|---|---|---|
| 239,432 | 3/1881 | Bollee ............................. | 280/93 X |
| 2,834,605 | 5/1958 | McCollough ...................... | 280/91 |
| 2,875,842 | 3/1959 | Morrell ........................... | 280/93 X |
| 2,913,063 | 11/1959 | Brown .............................. | 280/93 X |
| 2,995,380 | 8/1961 | King ................................ | 280/91 |
| 3,068,019 | 12/1962 | Ulinski ............................. | 280/93 X |

FOREIGN PATENTS OR APPLICATIONS

| 827,227 | 2/1960 | United Kingdom .................. | 280/93 |

*Primary Examiner*—David Schonberg
*Assistant Examiner*—Terrance L. Siemens

[57] ABSTRACT

Device for compensating the steering angles on the directional wheels of a vehicle, comprising, in combination, a pinion integral with the steering system control, a pair of pinions integral with the steering axles of the two directional wheels, a flexible transmission connecting said pinions, and a driving gear for said transmission, which driving gear is capable of differentiating the steering angles of said wheels according to a predetermined cyclic function.

2 Claims, 2 Drawing Figures

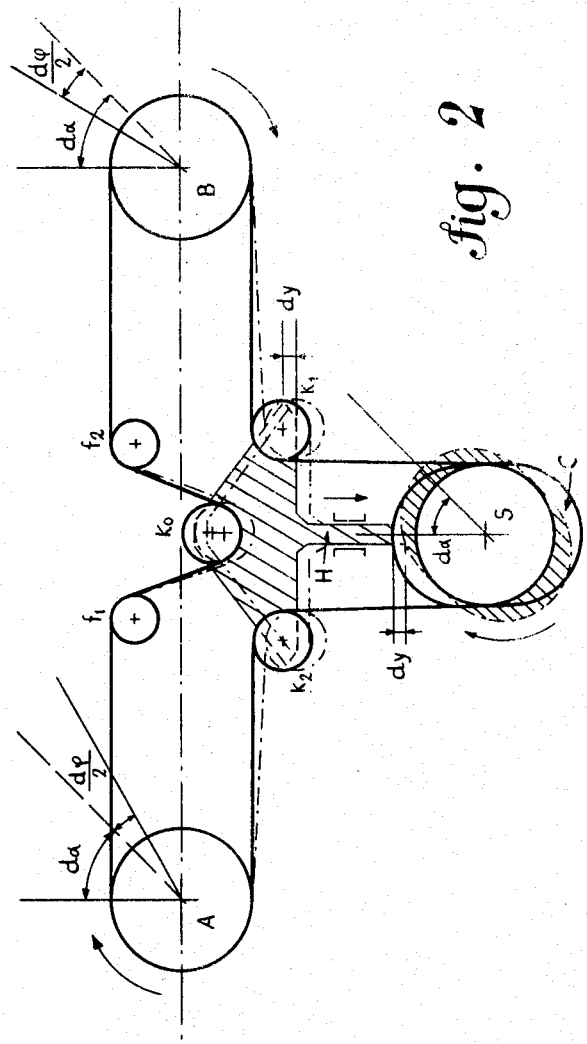

CONTROL MECHANISM FOR COMPENSATING STEERING ANGLES IN VEHICLE DIRECTIONAL WHEELS

The present invention concerns a control mechanism for the synchronous rotation of mechanical members with varying relative velocity (or phase) according to predetermined functions.

In particular, its application to the pair of directional wheels of a vehicle makes possible the realization of the well known condition of slipless rolling for any steering angle whatsoever; that is, being $i$ and $p$ the track and the axle base respectively:

$$\cot \alpha_1 - \cot \alpha_2 = i/P \qquad (1)$$

where $\alpha_1$ and $\alpha_2$ are the axle rotation angles of the directional wheels with respect to the straightforward driving position (FIG. 1).

The various prior art devices for accomplishing this purpose are rather complex (such as Davis steering system, Bernardi's biquadrilateral, etc.) and are therefore at present almost completely discarded or provide partial solutions, that is, fit only for a certain value of the steering angle (such as for instance Jeanteaud).

The object of the present invention is to realize a device which not only solves the abovesaid problem in a new and simple way, for every steering angle within 360°, but also lends itself to a large range of applications in the servocontrol field, where the synchronous rotation of two or more mechanical members must be accompanied by relative phase variations, such as for instance: rotative supports for undirectional light sources the beams of which must travel in superposition along one direction, or periodically interfere (dynamic holography, interferometric surveys on moving objects, special optical effects, etc.); signal receiver/transmitter for remote controls and similar applications.

Its operation is based on the path variation of a motion transmitting (during rotation) flexible element, which variation is caused by the displacement of three tensioning rolls (or pinions), integral with a cam moved slider (or by a device of similar function) which cam is keyed on the control member for rotation therewith. In fact (FIG. 2), if in a clockwise rotation the flexible length which unwinds from right wheel pinion A is larger than that which is wound on left wheel pinion B of an amount equal to L, pinion B will be lagging in relation to A by an angle:

$$\phi = 2L/D \qquad (2)$$

where $D$ is the pitch diameter of S, A, B; and viceversa in case anticlockwise rotation.

The foregoing objects and advantages of the invention will become apparent from the detailed description contained herein, taken with the drawings in which:

FIG. 1 is a schematic illustration of the invention employed to control the directional or steered wheels of a dolly of the type used for television and movie cameras; and FIG. 2 is an enlarged schematic view of a portion of the structure shown in FIG. 1 with certain elements illustrated in phantom in alternate position.

The FIG. 1 diagram shows, only as an example and with no limitative or restrictive intent, the application of the mechanism to the control of the pair of directional wheels of a noiseless steering dolly, particularly fit for television and movie cameras, etc. Pinion S is keyed onto the base of the steering column for rotation therewith and is connected through a chain (or another type of suitable flexible drive) with pinions A and B, keyed on the steering knuckle pins of the wheels thereof. The chain, by passing over two idle wheels $F_1$ and $F_2$ (not needed for mechanism operation but useful in order to have the most advantageous geometrical arrangement) is kept under tension by pinions $K_0$, $K_1$, $K_2$ rotatably mounted on a slidable support member, with the pinions $K_0$, $K_1$, $K_2$ being arranged at the apexes of an isosceles triangle. The support member includes a slider arm H guided in a track for reciprocal movement by a cam C, integral with pinion S and designed in such a way as to carry out the desired relative speed (or phase) variation, during synchronous rotation of A and B.

In the illustrated example the cam C is almost elliptical; therefore the wheels return to their original position after each 180° cycle, or after rotation of the steering pinion S and its associated cam C through 180° in either direction.

The position of idle wheels $F_1$ and $F_2$ and triangularly arranged pinion $K_0$, $K_1$, $K_2$ are determined, through simple mechanical relations in such a way as, during translation of slider H, to make the chain path variation due to the movement of $K_0$ equal to the sum of the ones caused by the displacement of $K_1$ and $K_2$.

Starting from the initial arrangement, in FIG. 2, when C rotates with S clockwise through an angle $d\alpha$, the slide is made to translate through an amount dy determined by the cam design and carries therewith pinions $K_0$, $K_1$, $K_2$. The displacement of $K_1$ causes a decrease in the length of chain extending in the path between B and S of an amount $dL/2$ which length of chain is recovered by the rotation of S. In the meanwhile $K_0$ recovers, through rotation of pinion A, the length $dL$ resulting from the sum of the abovesaid amount and of that deriving from the displacement of $K_2$, symmetrical with respect to $K_1$, between pinions S and A. Therefore, B is lagging with respect to S of an angle $d\phi/2$, and S with respect to A of the same amount; we have, therefore, that B is lagging with respect to A of $d\phi$.

Still referring to FIG. 2 cam and keeping in mind (2), we have that, for a $\pi/2$ rotation of the steering system the corresponding angles of rotation for wheels A and B are:

$$\alpha_A, \alpha_B = \int_0^{\pi/2} d\alpha \pm \frac{L}{D} \int_0^L dL \qquad (3)$$

and the resulting relative phase variation is $\phi = 2L/D$ as hereinbefore seen. Continued rotation of the steering system for $\pi/2$ to $\pi$, slider H returns to its initial position, through translatory movement in the reversed direction. During this phase, the speed of B with respect to S increases, whereas that of A decreases, so that a further 90° rotation of the steering system respectively implies for A and B angles of rotation:

$$\alpha_A, \alpha_B = \int_{\pi/2}^{\pi} d\alpha \mp \frac{L}{D} \int_0^L dL \qquad (4)$$

By adding (3) and (4) it is seen that, after a 180° cycle, S, A and B though rotating at different speeds, have swept the same total angular path (180°), returning to their starting position.

The same holds true in the case of an anticlockwise rotation of the steering system: clearly the function of A and B will be then inverted.

The operation of the mechanism having thus been illustrated in a particular case, it is important to point out that, for a given system geometry, the flexible length path variation is a function of the slide stroke only, and therefore of the shape of cam C which rotates with S.

In a more general way, one may then take $L = \lambda(\alpha)$, where $\lambda$ is the function which links cam rotation, through slide displacement, to the flexible length path variations between wheels A and B.

Therefore, to rotation angles of the steering system of $n\pi$ (with n being an integer or a fraction) there correspond rotation angles of A and B respectively given by:

$$\alpha_A, \alpha_B = \int_0^{n\pi} [L \pm \lambda(\alpha)/D] \, d\alpha \qquad (5)$$

Eventually, it is clear that by giving different shapes to the cam one may predetermine different functions which adjust the relative velocity (or angular phase) variations of two or more mechanical members synchronously rotating.

The present invention has been described in one preferred embodiment thereof, but it is understood that the skilled in the art may make constructional modifications without departing from the spirit and scope of the present invention as claimed hereinafter.

Having thus described the present invention, what is claimed is:

1. A device for compensating the steering angles of two directional wheels of a vehicle comprising in combination first and second control pinions rigidly connected one to the steering knuckle pins of each of the directional wheels for rotation therewith during steering movement, an endless flexible drive element coupling said first and second pinions to one another, a steering pinion operatively coupled to said flexible drive element, a cam element rigidly connected with said steering wheel for rotation therewith, a slide follower member engaging said cam element and mounted for to-and-fro movement under the action of said cam element, first, second and third idler pinions rotatably mounted on said slide member and arranged thereon with their axes of rotation forming the apexes of an isosceles triangle, said idler pinions each being coupled with said flexible drive element, the first of said idler pinions being arranged at the apex formed by isosceles sides and engaging on the outer periphery of said flexible drive element along a first length thereof extending between said first and second control pinions so as to cause said first and second control pinions to perform an oscillating movement in opposite direction to one another upon translation movement of said first idler pinion as a result of said to-and-fro movement of said slide follower member, said second and third idler pinions being arranged at the other two apexes of the isosceles triangle and engaging said flexible drive element on the outer periphery thereof one between said first control pinion and said steering pinion and the other between said steering pinion and said second control pinion.

2. A device as claimed in claim 1 further comprising a pair of fixed idler pinions engaging the inner periphery of said flexible drum element one on each side of said first idler pinion between said first idler pinion and said first and second control pinions respectively.

* * * * *